March 26, 1957     M. D. ISSERLIS     2,786,609
MATERIAL FEED BIN
Filed Dec. 12, 1952
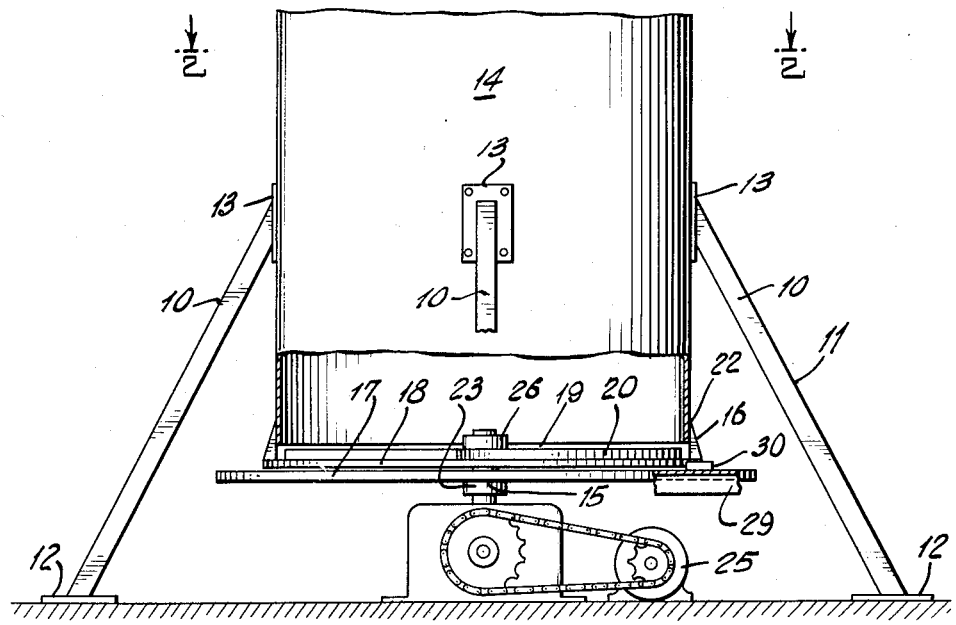
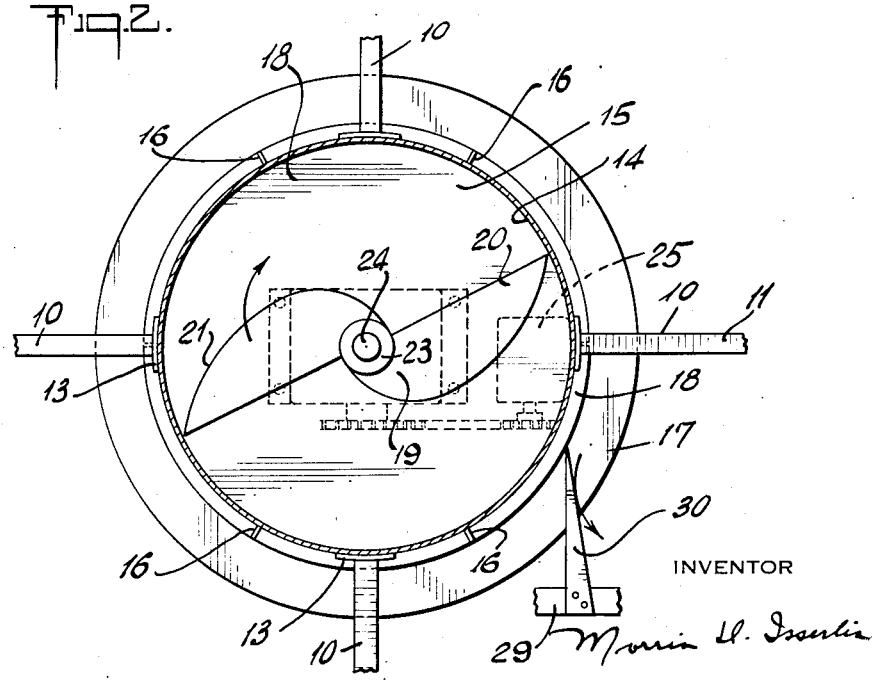
INVENTOR
Morris D. Isserlis

United States Patent Office 2,786,609
Patented Mar. 26, 1957

2,786,609

MATERIAL FEED BIN

Morris D. Isserlis, New Brunswick, N. J.

Application December 12, 1952, Serial No. 325,669

3 Claims. (Cl. 222—227)

This invention relates to a bin feeding device having the function of storing and feeding material uniformly at a predetermined rate. In one of its most important aspects it is concerned with turn tables for bin feeding. The device feeds any sticky material, or lumpy material difficult if not impossible to be handled automatically with equipment of the prior art. By way of example materials easily fed by the product of the invention but that could not be handled by such earlier devices are: filter cake, crystalline materials, damp or dry materials, fine powders such as clay, pigments, talc, etc. Of course free flowing materials can be handled well.

In operation, the turn table is placed immediately below a stationary bin, and the materials are deposited into the upper end of the bin, from which movement of the rotating plow and turn table discharges them.

The stationary bin is preferably an open ended cylinder, while the turn table consists of rotating plow means over a stationary plate, a rotating discharge plate located below the stationary plate, a stationary plow for removing material from the discharge plate, and means for rotating the discharge plate and plow means relative to said bin, said stationary plow and said stationary plate.

It is an object of the invention to provide an efficient device for urging passage of material from a bin into other processing devices or into containers. Another object of the invention is provision of such a device insuring relatively even flow of the material. Additional objects are provision of portable devices of this type, of devices that may be readily assembled and disassembled, and to provide means for feeding at several points at once, by having several movable plows and scrapers at different points. Yet another object is the discharge of material of various thicknesses and shapes, by varying the type of discharge opening, shape of discharge blade, and annular clearances. Still another object is provision of means for feeding from a large stationary bin, where the discharge opening may be left very large so that even the stickiest material may flow readily to a smaller rotating bin feeder. Another object is to feed lumpy material by having the discharge plow cut the lumps of the material. In this respect the product of the invention acts as a mill.

Other important objects of the invention are provision of means for feeding material having large pieces of foreign matter, such as stones or bricks, by the expedient of leaving a large enough annular clearance between the rotating plow and the stationary cylinder. Yet another object is to provide positive means for moving all material at the bottom of a mass toward the discharge opening thus insuring constant replacement by new material.

Another object is provision of apparatus of simplified construction requiring but very few machined parts, but performing efficiently at very low power, and which, resulting from its simple and ingenious construction, may be constructed at minimum cost.

Other objects and advantages will be understood from the following description of the invention, particularly when considered with the appended drawings wherein similar numerals refer to similar parts throughout the views shown. In these drawings:

Fig. 1 is a side view of the rotating bin feeder with parts broken away and in section.

Fig. 2 is a plan horizontal section through line 2—2 of Fig. 1.

Referring now to the drawings, a supporting frame generally indicated at 10 and comprising upright angle members, held in spaced relation by ground supports 12 by means of connectors 13 support a stationary bin 14, usually a hollow cylinder of any desired size.

At the bottom of the stationary bin is a revolving plow and turn table, generally indicated at 15. The turn table and plow forms the feeding mechanism of the device, and may if desired be moved from bin to bin. Where semipermanent or permanent installation is desired, it may be connected to bin 14 by connectors 16 arranged around the circumference of the bin 14. The turn table has a rotating discharge plate 17, preferably somewhat larger than the bin 14, on top of this discharge plate a stationary bottom 18, and on top of this stationary bottom 18 moves rotary plow means, generally indicated as 19. This plow, preferably has several blades 20, preferably balancing each other as indicated in the drawing and sweeping the entire cross sectional area of the bin 14. The leading edge 21 of each blade is preferably shaped to form an Archimedes spiral.

In this manner the blades 20 chew into the bottom of any material resting on the stationary bottom 18 and forces it outwards between the bottom end 22 of the stationary bin and the top of stationary bottom 18, thus extruding slices of the material onto rotating discharge plate 17, the rotation of which urges the material away from the blade and out of the bin. Material may be removed from discharge plate 17 at desired locations by providing one or more suitably located stationary plows or scrapers 30. The scrapers 30 may be supported by frame members 29.

Supporting the entire turn table 15 is a standard 23 including a rotating axle 24 moved in turn by driving means such as an electrical motor 25 indicated schematically in the drawing. The stationary parts and particularly stationary bottom 18 are connected to the stationary part 26 of the standard 23, while the rotating parts are attached and driven by the rotating axle 24.

The invention provides a bin for materials capable of achieving the several objects set forth in the introductory portion of this specification and a turn table as basic unit for such a bin. Using this turn table materials of high viscosity, sticky consistency or great lumpiness and other materials may be removed readily from a storage bin and moved from it. The movable part of the unit may readily be disconnected and transported from unit to unit for reattachment.

It is of course understood that the foregoing description is illustrative only, and that numerous changes may be made therein without departing from the spirit of the invention as defined by the appended claims. The instant application is a continuation in part of application Serial No. 250,150 filed October 6, 1951 by the same applicant, Morris D. Isserlis, now Patent No. 2,775,371 issued Dec. 25, 1956.

I claim:

1. A material feed bin assembly comprising a vertically disposed hollow cylindrical bin element, an imperforate bottom plate at the lower end of said bin element, means for supporting said bottom plate in a horizontal position spaced below the lower end of said bin element to define therewith an annular discharge opening, a rotatable shaft projecting through said plate centrally of said annular opening, plow means fixed to said shaft for rotation therewith adjacent the upper surface of said plate, a table element fixed to said shaft for rotation therewith, said table element underlying said bottom plate and extending from said shaft beyond the periphery of said bottom plate, and means for rotating said shaft to cause said plow means to impel material through said discharge opening onto said table element.

2. A material feed bin assembly comprising a vertically disposed hollow cylindrical bin element, an imperforate bottom plate at the lower end of said bin element, means for supporting said bottom plate in a horizontal position spaced below the lower end of said bin element to define therewith an annular discharge opening, a rotatable shaft projecting through said plate centrally of said annular opening, a plurality of radially extending curved blades fixed to said shaft for rotation therewith adjacent the upper surface of said plate, said blades extending radially from said shaft to said annular discharge opening and having a vertical thickness substantially equal to the spacing between said bottom plate and the lower end of said bin element, a circular table element fixed to said shaft for rotation therewith, said table element underlying said bottom plate and extending from said shaft beyond the periphery of said bottom plate, and means for rotating said shaft to cause said blades to impel material through said discharge opening onto said table element.

3. A material feed bin assembly as recited in claim 2 wherein the leading edge of each blade is curved in the form of an Archimedes spiral and including a stationary scraper extending across the projecting portion of said table element closely adjacent the upper surface thereof and operable, upon rotation of said table element, to scrape material therefrom.

References Cited in the file of this patent
UNITED STATES PATENTS

| | | |
|---|---|---|
| 684,346 | Bowsher | Oct. 8, 1901 |
| 818,585 | Trump | Apr. 24, 1906 |
| 895,489 | Morse | Aug. 11, 1908 |
| 911,816 | Gielow | Feb. 9, 1909 |
| 1,936,105 | Cole | Nov. 21, 1933 |
| 1,993,249 | Scholz | Mar. 5, 1935 |
| 2,329,948 | Shallock | Sept. 21, 1943 |
| 2,364,601 | Colvin | Dec. 12, 1944 |
| 2,435,039 | Harper | Jan. 27, 1948 |
| 2,574,231 | Sinden | Nov. 6, 1951 |